(12) United States Patent
Moore

(10) Patent No.: US 6,698,590 B2
(45) Date of Patent: *Mar. 2, 2004

(54) PACKAGE FOR A SUNCREAM

(75) Inventor: Peter John Moore, Concord (AU)

(73) Assignee: Crown Laboratories, Inc., Johnson City, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/139,593

(22) Filed: May 3, 2002

(65) Prior Publication Data

US 2003/0006161 A1 Jan. 9, 2003

Related U.S. Application Data

(63) Continuation of application No. 09/463,234, filed on Mar. 20, 2000, now Pat. No. 6,405,867.

(30) Foreign Application Priority Data

Jul. 21, 1997 (AU) .......................................... PO 8132

(51) Int. Cl.⁷ .............................................. B65D 41/00
(52) U.S. Cl. .................................... 206/459.1; 215/230
(58) Field of Search ................................ 116/220, 270; 206/459.1, 484, 807; 215/230; 250/474.1

(56) References Cited

U.S. PATENT DOCUMENTS

| | | |
|---|---|---|
| 3,899,677 A | 8/1975 | Hori et al. |
| 3,903,423 A | 9/1975 | Zweig |
| 4,198,861 A | 4/1980 | Mung-Kuen Luk |
| 4,271,984 A | 6/1981 | Ducros et al. |
| 4,818,491 A | 4/1989 | Fariss |
| 5,117,116 A | 5/1992 | Bannard et al. |
| 5,581,090 A * | 12/1996 | Goudjil ................... 250/474.1 |
| 5,589,398 A | 12/1996 | Krause et al. |
| 6,405,867 B1 | 6/2002 | Moore |

FOREIGN PATENT DOCUMENTS

| | | |
|---|---|---|
| EP | 0 758 615 A | 2/1997 |
| FR | 2 741 043 A | 11/1995 |

* cited by examiner

*Primary Examiner*—Jim Foster
(74) *Attorney, Agent, or Firm*—Webb Ziesenheim Logsdon Orkin & Hanson, P.C.

(57) ABSTRACT

A bottle (1) includes a base (2) and a continuous sidewall (3) extending upwardly from the periphery of the base (2) to a neck (4). The neck defines an opening (5) which is selectively blocked by a lid (6). Base (2) and sidewall (3) define a cavity for containing a suncream or the like which a person selectively applies to their skin to reduce the harmful effects of the sun's rays. The package also contains display means for providing a person with the indication of the intensity of UV radiation, or another ambient condition, incident upon the package.

9 Claims, 5 Drawing Sheets

PACKAGE FOR A SUNCREAM

FIELD OF THE INVENTION

The present invention relates to a package and in particular to a package for a suncream.

BACKGROUND OF THE INVENTION

The invention has been developed primarily for use with suncreams or other forms of sun screening creams and will be described hereinafter with reference to that particular application. It will be appreciated that the invention is not limited to that field of use and is also applicable to other skin care products. In this regard it should be noted that the term "suncream" as used herein is intended to include any preparation intended for application to the skin of humans and which has:

- a sun screening factor; or
- the ability to reduce the intensity of ultraviolet (UV) radiation that would otherwise be incident upon the skin; or
- a soothing or healing effect to skin which has become "sun burnt" or otherwise damaged due to exposure or over exposure to UV of other radiation.

Accordingly, this term encompasses after sun preparations, sun blocking creams, barrier creams or the like, whether or not these are intended for direct use as a suncream or whether contained within a cosmetic preparation.

Hitherto, sun creams or other skin care products have been packaged in conventional plastic or glass bottles to provide a convenient transportable reservoir of the cream. Often such bottles will carry information about the sun protection factor (SPF) offered by the cream or product contained within. The person or persons intending to use the cream as an impediment against skin damage caused by the sun's rays, and more particularly by TV radiation, can use this information as a guide to the level of protection offered to their skin by the cream. However, SPF information is neither readily understood nor properly used by a significant percentage of the population and does not provide anything other than rudimentary information on the circumstances in which the cream will be beneficial.

DISCLOSURE OF THE INVENTION

It is an object of the present invention, at least in the preferred embodiment, to overcome or substantially ameliorate one or more disadvantages of the prior art.

According to a first aspect of the invention there is provided a package for a suncream, the package defining a cavity for containing the suncream and display means for providing a person with an indication of the intensity of UV radiation incident upon the package.

Preferably, the display means indicates to the person that ambient conditions warrant the application of the cream to the person's skin.

According to another aspect of the invention there is provided a package for containing a suncream, the package including display means for indicating to a person that one or more predetermined ambient conditions warrant the application of the cream to the person's skin.

Preferably, the predetermined ambient conditions include the intensity of the UV radiation incident upon the package. In other embodiments, however, the predetermined ambient conditions include the temperature of the package.

More preferably, the package is a bottle which includes a base and at least one sidewall extending upwardly from the base to define a cavity for containing the suncream. Even more preferably, the sidewall includes an opening for allowing selective removal of the suncream from the cavity and being selectively closed by a lid. More preferably, the lid is rotatably mounted to the sidewall for movement between an open and a closed configuration.

In a preferred form, the display means is located on one or more of the following: the sidewall; the base; and the lid.

Preferably, the display means includes a region of photochromic material which changes colour in response to the intensity of the UV radiation incident upon the region. In other embodiments, however, the display means includes a region of thermochromic material which changes colour in response to the temperature of the region.

Preferably, the display means includes a multi-coloured strip located adjacent the region for indicating which of the colours taken by the region correspond to a high intensity of UV radiation.

Alternatively, the region includes the lid, wherein the sidewall, at least adjacent the opening, is coloured to correspond with the colour of the lid when a high level of UV radiation is incident thereupon.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
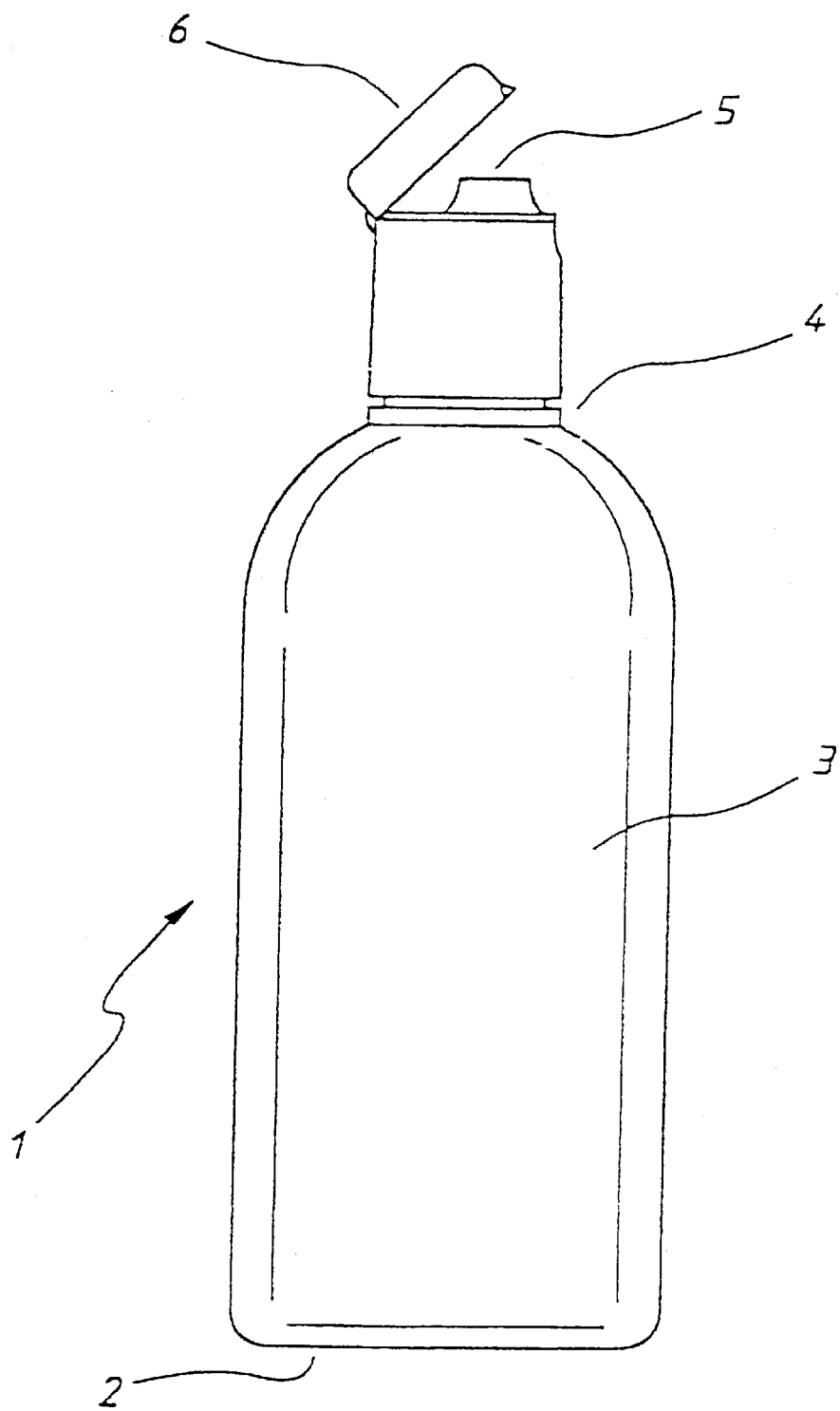
FIG. 1 is a side view of a bottle according to the invention.

Referring to FIG. 1 there is illustrated a bottle 1 including a base 2 and a continuous sidewall 3 extending upwardly from the periphery of base 2 to a neck 4. The neck defines an opening 5 which is selectively blocked by a lid 6. Base 2 and sidewall 3 define a cavity for containing a suncream or the like which a person selectively applies to their skin to reduce the harmful effects of the suns rays. As discussed above, these harmful effects are predominantly due to UV radiation and, accordingly, suncream is intended to be translucent or opaque to such radiation.

Typical suncreams include active ingredients such as zinc oxide, titanium dioxide, octyl methoxy cinnimate, octyl crylene, butyl methoxy dibenzoylmethane, methoxy benzophenone, phenylbenzimidazole-5-sulphonic acid to create between the sun and the skin a barrier to UV radiation. Other active ingredients are known to those in the art. Moreover, some suncreams utilise a combination of the above or other ingredients.

Bottle 1 is formed from plastics material and preferably from high density polyethylene (HDPE). Other bottles are produced from other plastics such as: low density polyethylene (LDPE); high density polypropylene (HDPP); low density polypropylene (LDPP); PET (Recycled plastic); or PVC. It is also known to package suncreams in glass or other bottles.

In the FIG. 1 embodiment, the HDPE is mixed prior to moulding with a photochromic dye that is responsive to the intensity of ultraviolet radiation incident thereupon. Sufficient dye is included to ensure that the colour of the resultant package, as perceived by a person, varies with the intensity of the UV radiation incident upon the bottle. Accordingly, bottle 1 provides an indication to a person that ambient conditions warrant the application of the suncream.

Figure 2:
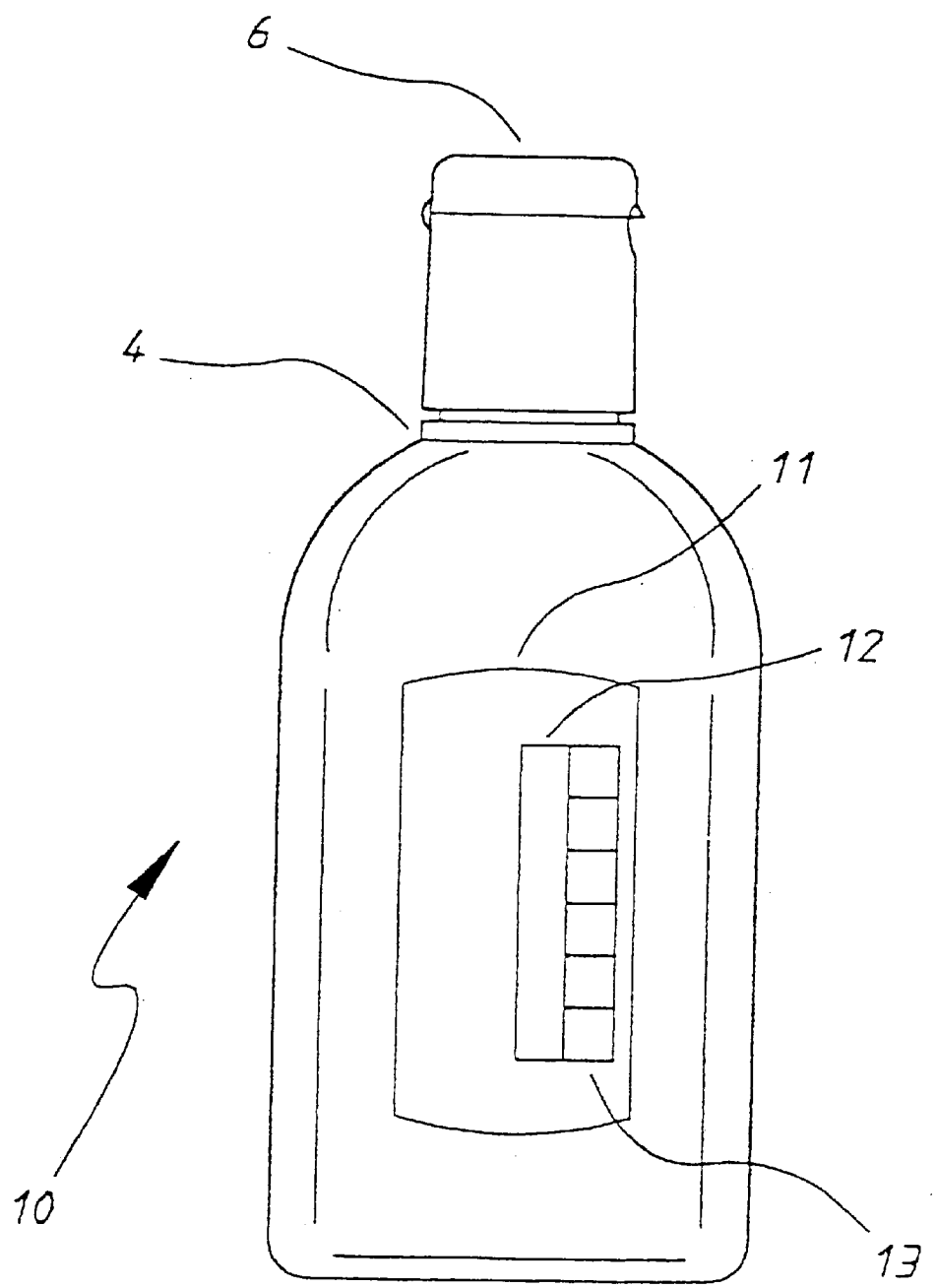
FIG. 2 is a side view of an alternative bottle according to the invention.

Referring now to FIG. 2, where corresponding features are denoted by corresponding reference numerals, there is illustrated an alternative bottle 10. Bottle 10 is a conventional plastics bottle which includes an adhered label 11 having a photochromic region 12. Disposed adjacent to region 12 is a colour placard 13 which includes a plurality of discreet segments of colours which correspond to the colour indicated by region 11 when subject to different respective intensities of ultraviolet radiation. Label 11 also includes explanatory indicia indicating which of the colours in the respective segments correspond to a high level of radiation and as such when the suncream should be applied. For example, when the colour of the region corresponds to the colour of a particular segment the indicia may advise that persons with fair skin should apply the suncream to any exposed skin, while correspondence with a different segment may advice that any person would be advised to apply the suncream.

In some embodiments either label 11 is removable or region 12 and placard 13 are removable. In further embodiments label 11 is removably attached to neck 4 by a cord or, alternatively, it includes an aperture which receives neck 4. In other embodiments label 11 is maintained in engagement with bottle 10 by way of shrink wrap.

Figure 3:
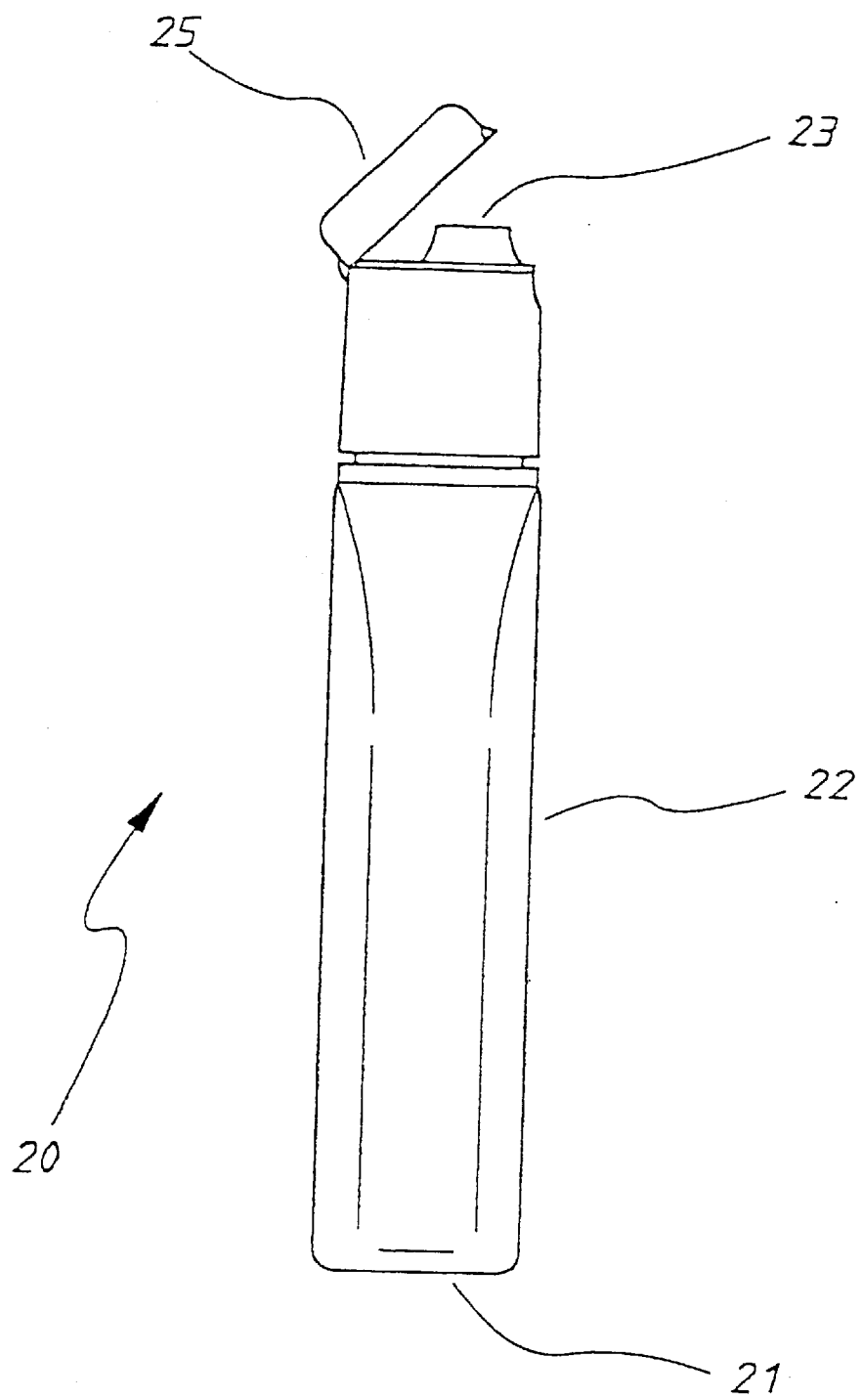
FIG. 3 is a side view of a further alternative bottle according to the invention.

Another alternative bottle 20 is shown in FIG. 3. Bottle 20 includes a base 21 and a sidewall 22 extending upwardly from the base to define an opening 23. Opening 23 is selectively closed by a lid 25. Base 21 and sidewall 22 are produced from HDPE, while lid 25 is produced from HDPE including a photochromic dye. Moreover, base 21 and sidewall 22 are coloured to correspond to the colour of lid 23 when subject to a high level of UV radiation. Again, this indicates to a person that the UV radiation levels are sufficiently intense to warrant the use of the suncream included within bottle 20.

In other forms, it is only the portion of sidewall 22 immediately adjacent lid 23 that is coloured to correspond to the colour of lid 23 when subject to a high level of UV radiation. As will be appreciated by those skilled in the art from the disclosure herein, any portion of the bottle, including the lid, can include photochromic material of the kind which will provide a perceptible colour change to a person upon variation in the intensity of UV radiation.

Figure 4:
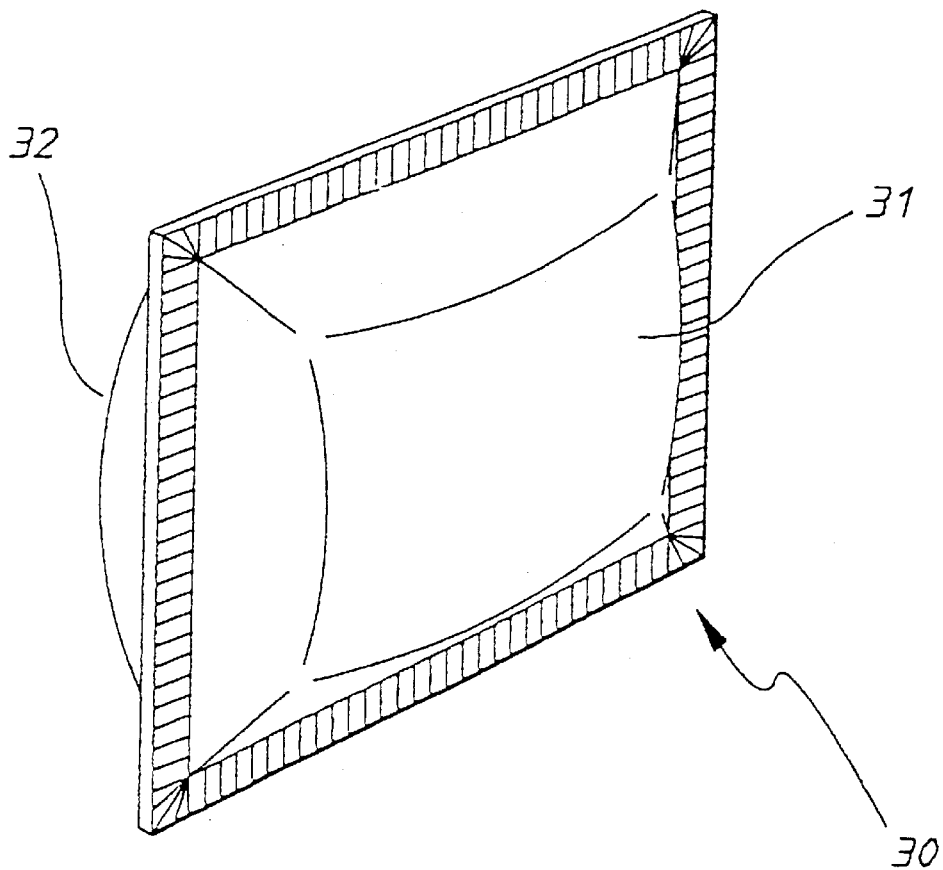
FIG. 4 is a perspective view of a satchel according to the invention.

Packages other than bottles can also embody the invention. For example, a satchel 30, such as that used for the sale of small quantities of suncream or for promotional purposes, is illustrated in FIG. 4. Satchel 30 includes two opposed frangible sidewalls 31 and 32 which are heat welded or crimped together to enclose the suncream. Sidewall 31 includes a photochromic dye, while sidewall 32 is coloured such that when the colour of the two sidewalls correspond it indicates that use of the suncream enclosed in the satchel is warranted.

The photochromic dye is included integrally within sidewall 31. In other embodiments, however, the photochromic dye is included within a layer of material that is laminated to sidewall 31 and not sidewall 32.

In an alternative embodiment both sidewalls include photochromic dye.

Figure 5:
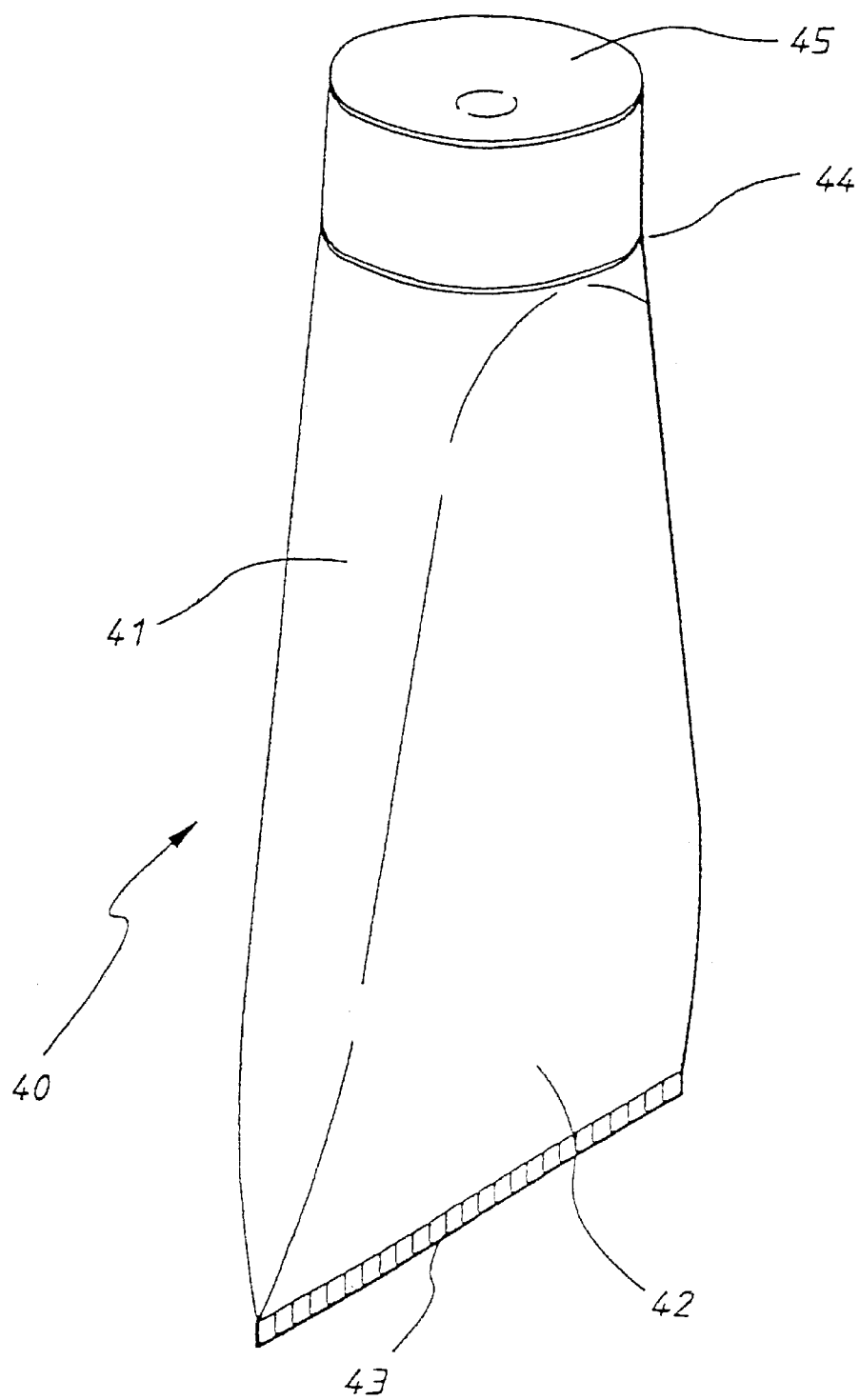
FIG. 5 is a perspective view of a tube according to the invention.

The invention is equally applicable to packages such as tubes or lined cardboard containers. By way of example, a tube 40 embodying the invention is illustrated in FIG. 5. Tube 40 includes a sidewall 41 which extends between a flattened end 42 defined by a heat weld 43 and a cylindrical end 44 defining a threaded opening (not shown). The opening is selectively covered by a lid 45 for preventing inadvertent dispensing of the suncream contained within the tube.

Sidewall 41 is impregnated with a photochromic dye that is responsive to the intensity of ultraviolet radiation incident thereupon. Sufficient dye is included to ensure that the colour of the resultant package, as perceived by a person, varies with the intensity of the UV radiation incident upon the tube.

In some embodiments the display means changes colour in response to different temperatures. In one of these embodiments the package contains an after sun lotion and the region is intended for placement against the skin of a person. Once removed from the skin, if the region takes a predetermined colour this indicates to the person that the lotion should be applied to their skin.

Although the invention has been described with reference to particular examples it would be appreciated by those skilled in the art that it may be embodied in many other forms.

What is claimed is:

1. A package for a suncream including:

a base;

at least one plastic molded sidewall extending upwardly from the base for defining collectively with the base a cavity for containing the suncream, wherein the sidewall includes an integral photochromic dye molded with the sidewall for causing a color of the sidewall to change from a first predetermined color to a second predetermined color as the intensity of UV radiation incident upon the sidewall increases, the second color being discernible from the first color for providing a user with a visible indication that the UV radiation incident upon the sidewall is sufficiently intense to warrant application of the suncream to the exposed skin of the user;

an opening in the sidewall for allowing the user to dispense the suncream from the package; and a cap for moving between an open and a closed configuration for allowing and preventing the dispensing of the suncream through the opening, wherein the cap is threaded about the opening and wherein the cap is a color which is about the same as the second color.

2. A package for a suncream including:

a base;

at least one plastic molded sidewall extending upwardly from the base for defining collectively with the base a cavity for containing the suncream, wherein the sidewall includes an integral photochromic dye molded with the sidewall for causing a color of the sidewall to change from a first predetermined color to a second predetermined color as the intensity of UV radiation incident upon the sidewall increases, the second color being discernible from the first color for providing a user with a visible indication that the UV radiation incident upon the sidewall is sufficiently intense to warrant application of the suncream to the exposed skin of the user;

an opening in the sidewall for allowing the user to dispense the suncream from the package; and a cap for moving between an open and a closed configuration for allowing and preventing the dispensing of the suncream through the opening, wherein the cap is hingedly connected to the sidewall adjacent to the opening and wherein the cap is a color which is about the same as the second color.

3. A method of forming a package for a suncream having a base, at least one sidewall extending upwardly from the base for defining collectively with the base a cavity containing the suncream, and a UV detector that is integral with the sidewall for changing from a first predetermined color to a second predetermined color as the intensity of UV radiation incident upon the detector increases, the second color being discernible from the first color for providing a user with a visible indication that the UV radiation incident upon the sidewall is sufficiently intense to warrant application of the suncream to the exposed skin of the user, the method comprising the steps of:

mixing plastic material with a photochromic dye that is responsive to UV light prior to molding with the plastic material;

molding the base and at least one sidewall with the mixed plastic material and dye whereby the sidewall includes the integral UV detector; and molding a cap, wherein the cap is substantially of the second color.

4. A method of forming a package for a suncream having a base, at least one sidewall extending upwardly from the base for defining collectively with the base a cavity containing the suncream, and a UV detector that is integral with the sidewall for changing from a first predetermined color to a second predetermined color as the intensity of UV radiation incident upon the detector increases, the second color being discernible from the first color for providing a user with a visible indication that the UV radiation incident upon the sidewall is sufficiently intense to warrant application of the suncream to the exposed skin of the user, the method comprising the steps of:

mixing plastic material with a photochromic dye that is responsive to UV light prior to molding with the plastic material;

molding the base and at least one sidewall with the mixed plastic material and dye whereby the sidewall includes the integral UV detector; and providing a temperature detector, wherein the temperature detector is integrally mounted to the sidewall.

5. A method of forming a package for a suncream having a base, at least one sidewall extending upwardly from the base for defining collectively with the base a cavity containing the suncream, and a UV detector that is integral with the sidewall for changing from a first predetermined color to a second predetermined color as the intensity of UV radiation incident upon the detector increases, the second color being discernible from the first color for providing a user with a visible indication that the UV radiation incident upon the sidewall is sufficiently intense to warrant application of the suncream to the exposed skin of the user, the method comprising the steps of:

mixing plastic material with a photochromic dye that is responsive to UV light prior to molding with the plastic material; and molding the base and at least one sidewall with the mixed plastic material and dye whereby the sidewall includes the integral UV detector, wherein the base and the sidewall form a tube.

6. A substantially plastic suncream package including:

a molded base;

at least one molded sidewall extending upwardly from the base for defining collectively with the base a cavity containing the suncream;

a UV detector integral with the sidewall for changing from a first predetermined color to a second predetermined color as the intensity of UV radiation incident upon the detector increases, the second color being discernible from the first color for providing a user with a visible indication that the UV radiation incident upon the sidewall is sufficiently intense to warrant application of the suncream to the exposed skin of the user, wherein the UV detector includes photochromic dye mixed with plastic prior to molding the sidewall; and a cap for moving between an open and a closed configuration for allowing and preventing the dispensing of the suncream through the opening, wherein the cap is substantially of the second color.

7. A package according to claim 6, further including an opening in the sidewall.

8. A package according to claim 6, further including a temperature detector integrally mounted to the sidewall.

9. A package according to claim 6, wherein the sidewall and the base includes the integral photochromic dye that is integrally contained therein to define the UV detector.

* * * * *

UNITED STATES PATENT AND TRADEMARK OFFICE
CERTIFICATE OF CORRECTION

PATENT NO.    : 6,698,590 B2
DATED         : March 2, 2004
INVENTOR(S)   : Peter John Moore It is certified that error appears in the above-identified patent and that said Letters Patent is hereby corrected as shown below:

Column 1,
Line 38, "TV radiation" should read -- UV radiation --.
Line 50, to Column 2, Line 31, delete the text beginning with the paragraph:
"According to a first aspect of the invention… and ending with: …when a high level of UV radiation is incident thereupon." and insert therefor:
-- According ot the invention there is provided a package for suncream including:
at least one sidewall for defining a cavity to contain the suncream;
   display means being integral with the sidewall for changing colour to indicate to a person that one or more predetermined ambient conditions warrant the application of the suncream to the person's skin; and
   an opening in the sidewall for allowing removal of the suncream form the cavity.
   Preferably, one of the predetermined ambient conditions includes the intensity of UV-radiation incident upon the display means. More preferably, the display means includes a photochromic material.
   In other preferred embodiments, one of the predetermined ambient conditions includes the temperature of the display means. Preferably also, in such embodiments the display means includes a thermochromic material.
   In a preferred form the display means is integrated with the sidewall with adhesive.
   Preferably, the opening is selectively closeable by a lid, wherein the lid is coloured to correspond with the colour taken by the display means when indicating that suncream should be applied to the user's skin. More preferably, the lid is rotatably mounted to the sidewall for movement between an open and a close configuration.
   In a preferred form, the package includes an outer surface area which is greater than the surface area of the display means.
   Preferably, the display means includes a region of the sidewall and a multi-coloured strip which is located adjacent to that region for indicating which of the colours taken by the region correspond to a high intensity of UV radiation. More preferably, the strip is adhered to the outer surface.

UNITED STATES PATENT AND TRADEMARK OFFICE
CERTIFICATE OF CORRECTION

PATENT NO. : 6,698,590 B2
DATED : March 2, 2004
INVENTOR(S) : Peter John Moore

It is certified that error appears in the above-identified patent and that said Letters Patent is hereby corrected as shown below:

Preferably also, the package is formed from a plastic material, the material being mixed prior to moulding with a predetermined quantity of a photochromic dye such that the display means includes the outer surface area of the sidewall. --

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,698,590 B2
DATED : March 2, 2004
INVENTOR(S) : Peter John Moore

It is certified that error appears in the above-identified patent and that said Letters Patent is hereby corrected as shown below:

Column 1,
Line 38, "TV radiation" should read -- UV radiation --.
Line 50, to Column 2, Line 24, delete the text beginning with the paragraph:
"According to a first aspect of the invention… and ending with: …when a high level of UV radiation is incident thereupon." and insert therefor:
-- According to the invention there is provided a package for suncream including:
at least one sidewall for defining a cavity to contain the suncream;
    display means being integral with the sidewall for changing colour to indicate to a person that one or more predetermined ambient conditions warrant the application of the suncream to the person's skin; and
    an opening in the sidewall for allowing removal of the suncream from the cavity.
    Preferably, one of the predetermined ambient conditions includes the intensity of UV-radiation incident upon the display means. More preferably, the display means includes a photochromic material.
    In other preferred embodiments, one of the predetermined ambient conditions includes the temperature of the display means. Preferably also, in such embodiments the display means includes a thermochromic material.
    In a preferred form the display means is integrated with the sidewall with adhesive.
    Preferably, the opening is selectively closeable by a lid, wherein the lid is coloured to correspond with the colour taken by the display means when indicating that suncream should be applied to the user's skin. More preferably, the lid is rotatably mounted to the sidewall for movement between an open and a closed configuration.
    In a preferred form, the package includes an outer surface area which is greater than the surface area of the display means.
    Preferably, the display means includes a region of the sidewall and a multi-coloured strip which is located adjacent to that region for indicating which of the colours taken by the region correspond to a high intensity of UV radiation. More preferably, the strip is adhered to the outer surface.

UNITED STATES PATENT AND TRADEMARK OFFICE
CERTIFICATE OF CORRECTION

PATENT NO.    : 6,698,590 B2
DATED         : March 2, 2004
INVENTOR(S)   : Peter John Moore It is certified that error appears in the above-identified patent and that said Letters Patent is hereby corrected as shown below:

Preferably also, the package is formed from a plastic material, the material being mixed prior to moulding with a predetermined quantity of a photochromic dye such that the display means includes the outer surface area of the sidewall. --

This certificate supersedes Certificate of Correction issued August 31, 2004.

Signed and Sealed this

Ninth Day of November, 2004

JON W. DUDAS
*Director of the United States Patent and Trademark Office*